US008988878B2

(12) United States Patent
Lin et al.

(10) Patent No.: US 8,988,878 B2
(45) Date of Patent: Mar. 24, 2015

(54) ELECTRONIC DEVICE AND HOUSING THEREOF

(71) Applicant: Wistron Corporation, New Taipei (TW)

(72) Inventors: Ming-Chen Lin, New Taipei (TW); Ren-Tsung Huang, New Taipei (TW); Shih-Hua Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 277 days.

(21) Appl. No.: 13/771,556

(22) Filed: Feb. 20, 2013

(65) Prior Publication Data
US 2014/0140003 A1   May 22, 2014

(30) Foreign Application Priority Data

Nov. 16, 2012   (TW) .............................. 10122229 U

(51) Int. Cl.
*H05K 7/20*   (2006.01)
*G06F 1/20*   (2006.01)
(52) U.S. Cl.
CPC ...................................... *G06F 1/203* (2013.01)
USPC ................. 361/695; 361/679.48; 361/679.49; 361/694; 165/80.2; 165/122; 454/184
(58) Field of Classification Search
USPC ........................ 361/679.46–679.55, 688, 689, 361/690–697, 714–724; 165/80.2, 80.3, 165/80.4, 80.5, 104.33, 122–126, 185; 174/15.1, 16.3, 50, 50.05, 520; 454/184; 312/223.1, 223.2, 236, 265.5
See application file for complete search history.

(56) References Cited

U.S. PATENT DOCUMENTS

| | | | | |
|---|---|---|---|---|
| 5,354,625 A * | 10/1994 | Bentz et al. | ................... | 429/407 |
| 5,424,915 A * | 6/1995 | Katooka et al. | ............... | 361/695 |
| 5,493,473 A * | 2/1996 | Yanagi | .......................... | 361/695 |
| 5,505,533 A * | 4/1996 | Kammersqard et al. | ...... | 312/236 |
| 6,226,182 B1 * | 5/2001 | Maehara | ....................... | 361/695 |
| 6,618,248 B1 * | 9/2003 | Dalheimer | ............... | 361/679.33 |
| 2004/0207981 A1 * | 10/2004 | Gorenz et al. | ................ | 361/687 |
| 2009/0185348 A1 * | 7/2009 | Bretschneider et al. | ...... | 361/695 |
| 2011/0222243 A1 * | 9/2011 | Nagami et al. | ................ | 361/697 |

FOREIGN PATENT DOCUMENTS

JP   2007127822 A *   5/2007   ............. G03B 21/16

* cited by examiner

*Primary Examiner* — Michail V Datskovskiy
(74) *Attorney, Agent, or Firm* — Rabin & Berdo, P.C.

(57) ABSTRACT

An electronic device and housing thereof are provided. The electronic device includes housing, a partition, multiple electronic elements, and a fan. The housing has a side edge, where the side edge is provided with a slit. The partition is disposed in the case, is separated by a distance with the slit, and divides the interior of the case into a first and a second space. The partition has a through hole, the second space is in communication with the first space through the through hole, and the first space is in communication with the outside of the case through the slit. The electronic elements and the fan are disposed in the second space, and an air outlet of the fan is adjacent to the through hole, so that air in the second space can be driven to flow from the first space to the outside through the slit.

12 Claims, 6 Drawing Sheets

ELECTRONIC DEVICE AND HOUSING THEREOF

CROSS-REFERENCES TO RELATED APPLICATIONS

This non-provisional application claims priority under 35 U.S.C. §119(a) on Patent Application No. 101222290 filed in Taiwan, R.O.C. on Nov. 16, 2012, the entire contents of which are hereby incorporated by reference.

BACKGROUND

1. Technical Field

The present invention relates to an electronic device and a case thereof, and in particular to an electronic device in which a partition is used to divide the interior of a case into a first space and a second space and a case thereof.

2. Related Art

With the performance of a mobile electronic product increasing, a heat dissipation problem of an electronic element continues to challenge related practitioners, and especially, for providing a good portability and a large-scale visual area, not only does the weight of a current electronic product become lighter and lighter, but the thickness becomes thinner and thinner; consequently, practitioners of the electronic product industry make every effort to solve the heat dissipation problem.

Currently, most common mobile electronic products on the market, except a tablet computer and few small size notebook computers, are provided with a fan so as to discharge to the outside, heat produced when electronic elements in the interior operate. For a mobile electronic product provided with a fan in the interior, to discharge hot air to the outside a through hole is necessarily to be opened in several specific positions of a case thereof, where a part of the through hole is used as an outlet of hot air, and a part of the through hole allows outside cold air to enter the interior of the case of the electronic device. In current practices, an air outlet of a fan is closely adjacent to a through hole of a case, so as to directly discharge hot air to the outside of the case.

Based on the above, opening a through hole on a case certainly can effectively solve the heat dissipation problem; however, the aesthetic feeling of the appearance of an electronic product is also lowered at the same time, so that the electronic device fails to obtain the favor of customers who pay more attention to the aesthetic feeling than the performance in the market. To address this conflict of priorities between the engineering design and industrial design, a currently known compromise solution is that a slit is opened in a side edge of a mobile electronic product. As shown in FIG. 1, a slit 111a is opened in a side edge 111 of a case 11 of an electronic device 1, and an air outlet of a fan is disposed to be closely adjacent to the slit 111a, so as to discharge hot air through the slit 111a to the outside. Compared with a generally used gate-like through hole or mesh-like through hole of a conventional electronic product, a slit is not visually abrupt.

However, using a slit to replace a through hole also leads to restriction in the effect of heat dissipation. Since the width of a slit is relatively narrow, on the premise that the output of a fan keeps unchanged, hot air flow discharged from a slit in per unit of time will be reduced, and if the output of a fan is directly increased, the noise and power consumption are increased at the same time. Therefore, by adopting the design of a slit the heat dissipation capacity of a heat dissipation element is restricted and lowered.

SUMMARY

In view of this, one aspect of the present invention provides a housing of an electronic device, which is used for an electronic device including a fan, and mainly includes a case and a partition. The case has a side edge, where a slit is opened in the side edge. The partition is disposed in the case, separated by a distance with the slit, and divides the interior of the case into a first space and a second space. The partition has a through hole, the second space is in communication with the first space through the through hole, the first space is in communication with the outside of the case through the slit, the second space is used for receiving the fan, and an air flow blown by the fan flows through the through hole and enters the first space.

Another aspect of the present invention provides an electronic device, which mainly includes a case, a partition, a circuit board, and a fan. The case has a side edge, where a slit is opened in the side edge. The partition is disposed in the case, separated by a distance with the slit, and divides the interior of the case into a first space and a second space. The partition has a through hole, the second space is in communication with the first space through the through hole, the first space is in communication with the outside of the case through the slit, the second space is used for receiving the fan, and an air flow blown by the fan flows through the through hole and enters the first space. The circuit board and the fan are both disposed in the second space, the fan has an air outlet, and the air outlet is adjacent to the through hole of the partition.

One of ideas of the present invention is considering an effect of a back pressure at the air outlet of the fan on flow of the fan. By analyzing one of practices in the prior art, that is, the air outlet of the fan is directly and closely adjacent to a large-area heat dissipation hole in the case, it can be observed that the back pressure at the air outlet of the fan is low and the air flow is large; however, the overall appearance is not aesthetically satisfying. By further analyzing a practice that a large-area through hole is replaced by a long slit in the prior art, because the air outlet of the fan is disposed adjacent to the slit in the side edge of the case, the back pressure is high and the air flow is low; however, the appearance has much better aesthetic value.

To strike a balance between the heat dissipation and the appearance, one of the ideas of the present invention is dividing the interior of the case of the electronic device into the first space and the second space through the partition. An air flow blown by the fan first flows to the first space and then flows to the outside of the case through the slit. In this way, the air outlet of the fan is not tightly close to the slit but separated by a distance with the slit, and the blown air flow first enters the first space used as an air buffer area and then flows to the outside of the case through the slit, so that the back pressure at the air outlet of the fan is not greatly increased because of the design of the slit, and the flow of the fan is not too low because of the excessively high back pressure, thereby solving various problems that exist in the conventional art.

BRIEF DESCRIPTION OF THE DRAWINGS

The disclosure will become more fully understood from the detailed description given herein below for illustration only, and thus not limitative of the present invention, wherein.

DETAILED DESCRIPTION

Figure 1:
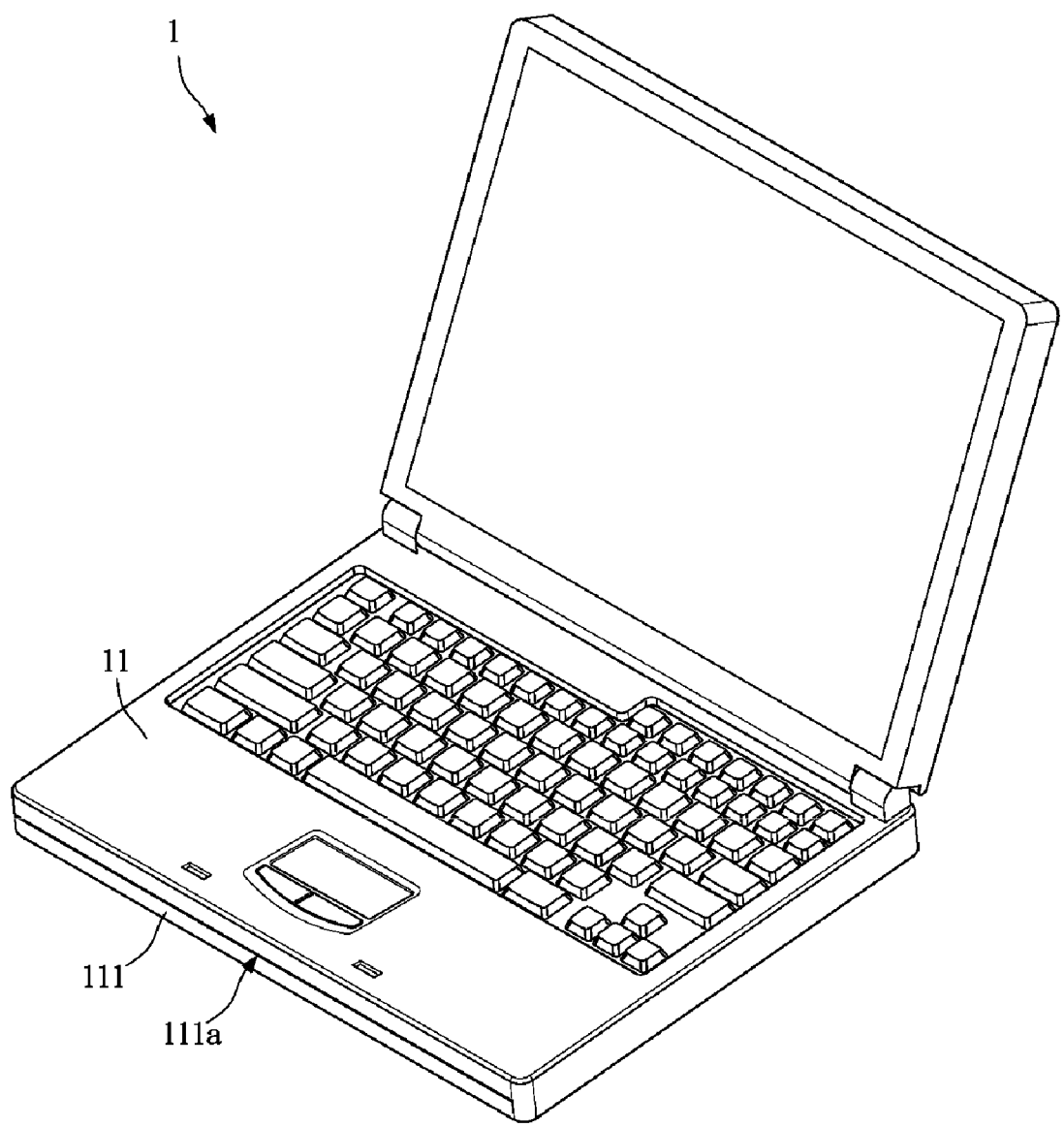
FIG. 1 is a schematic view of an electronic device in the prior art according to the present invention.
Figure 2:
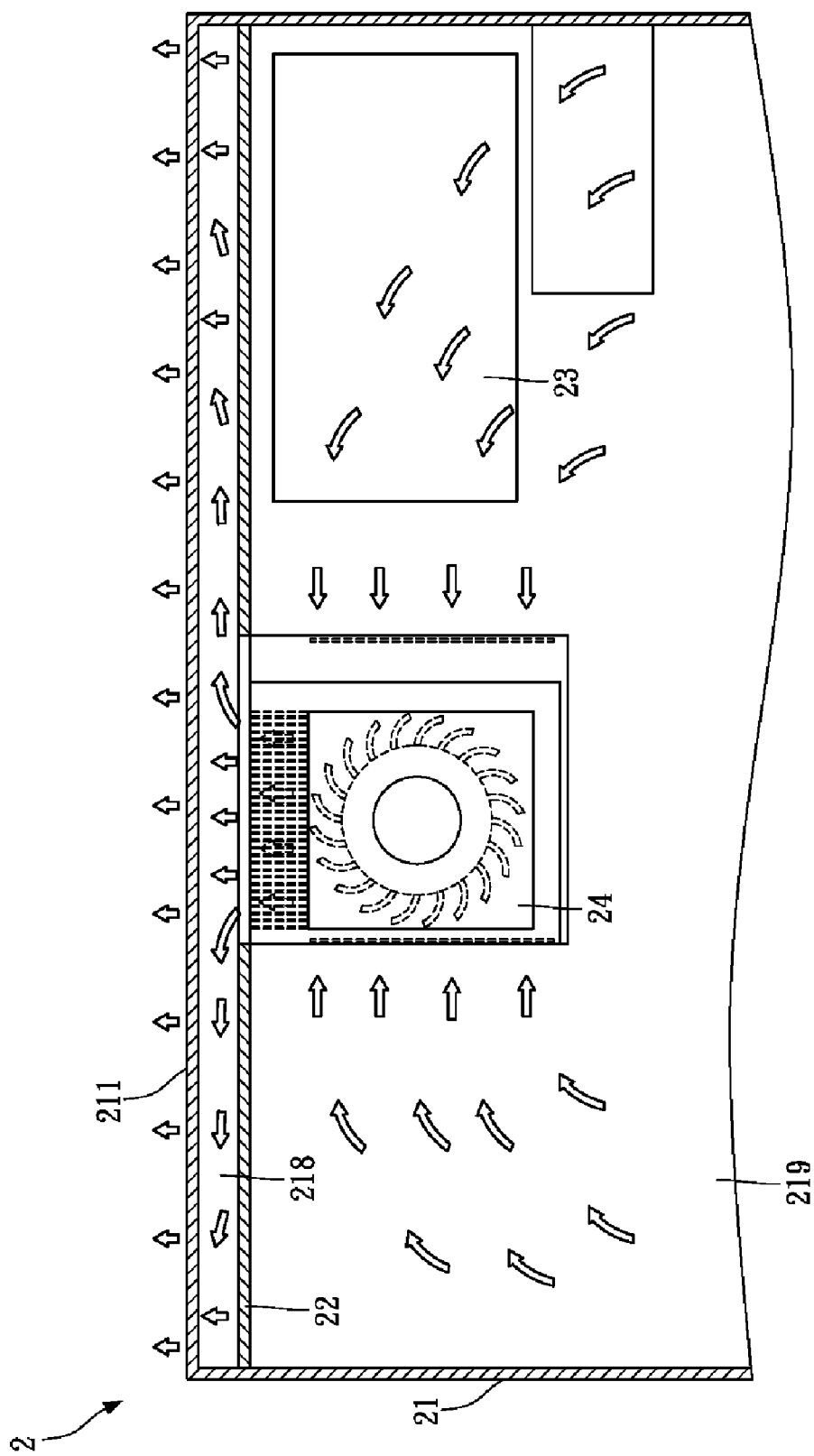
FIG. 2 is a schematic view (1) of an embodiment according to the present invention.
Figure 3:
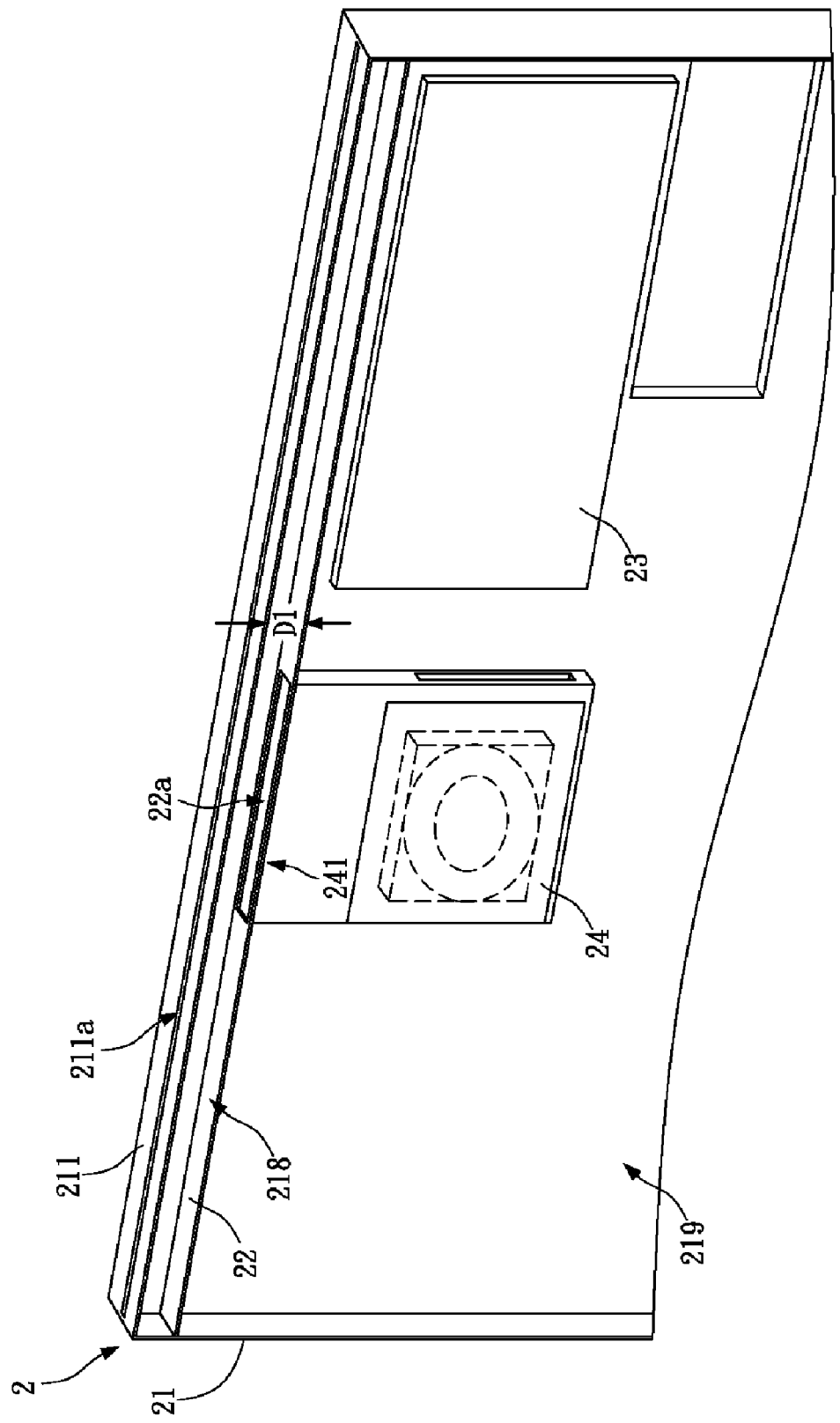
FIG. 3 is a schematic view (2) of an embodiment according to the present invention.

Please refer to FIG. 2 and FIG. 3, which are respectively a schematic view (1) and a schematic view (2) of an embodiment according to the present invention, which disclose a part of an electronic device 2, where the electronic device 2 in the first embodiment mainly includes a case 21, a partition 22, a circuit board 23, and a fan 24. Arrows shown in the drawings are used for representing flow directions of air flows in the case 21 when the fan operates.

The case 21 has a side edge 211, and a slit 211a is opened in the side edge 211. The partition 22 is disposed in the case 21, separated by a distance D1 with the slit 211a, and divides the interior of the case 21 into a first space 218 and a second space 219. The partition 22 has a through hole 22a, the second space 219 is in communication with the first space 218 through the through hole 22a, and the first space 218 is in communication with the outside of the case 21 through the slit 211a. The second space 219 is used for receiving the fan 24. An air flow blown by the fan 24 flows through the through hole 22a, and then enters the first space 218. The circuit board 23 and the fan 24 are disposed in the second space 219, the fan 24 has an air outlet 241, and the air outlet 241 is adjacent to the through hole 22a of the partition 22, so as to avoid an adverse effect on heat dissipation caused by an air flow, which is extracted by the fan 24 from the second space 219, flowing back to the second space 219.

In an implementation, the distance D1 (as shown in FIG. 3), between the partition 21 and the slit 211a is in a range from 0.5 cm to 2 cm, and the slit 211a extends to two ends of the side edge 211.

Figure 4:
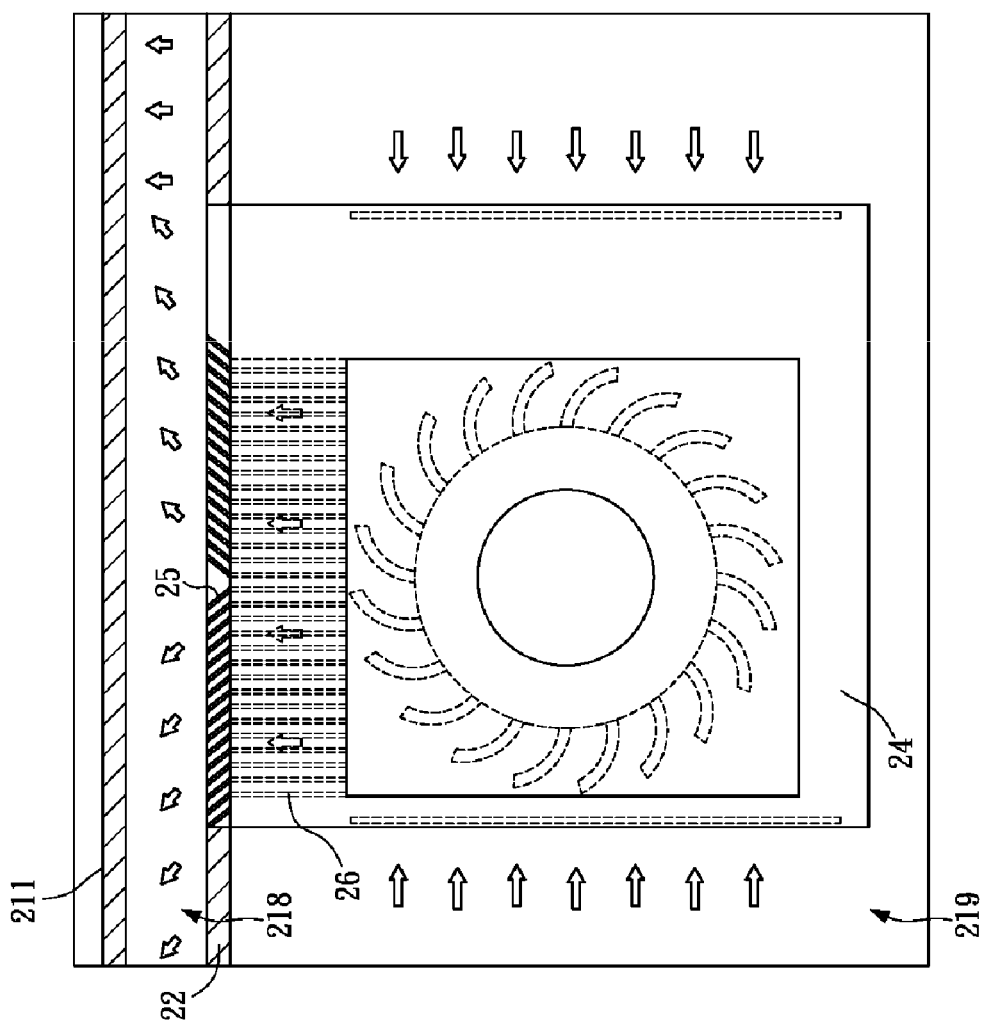
FIG. 4 is an enlarged view of a part of elements according to an embodiment of the present invention.

Please refer to FIG. 4, which is an enlarged view of a part of elements according to an embodiment of the present invention, which displays a combined part between a partition and a fan in this embodiment in enlarged manner. As shown in the drawing, in this embodiment, an electronic device 2 further includes an air guiding structure 25, which is disposed at an through hole 22a of the partition 22. The air guiding structure 25 is composed of multiple thin boards that are arranged at intervals and form a specific angle with the partition 22, and is used for guiding an air flow blown by the fan 24 to spread along a longitudinal axis of the slit 211a, so that the air flow blown by the fan 24 can fill the first space 218 quickly. In addition, the electronic device 2 further includes a heat dissipation fin 26 disposed at the air outlet 241 of the fan 24, where the heat dissipation fin 26 is generally combined with a heat pipe (not shown), the heat pipe transmits heat produced when an electronic element operates to the heat dissipation fin 26, and the heat is brought to the outside of the case 21 through the air flow produced by the fan 24.

Figure 5:
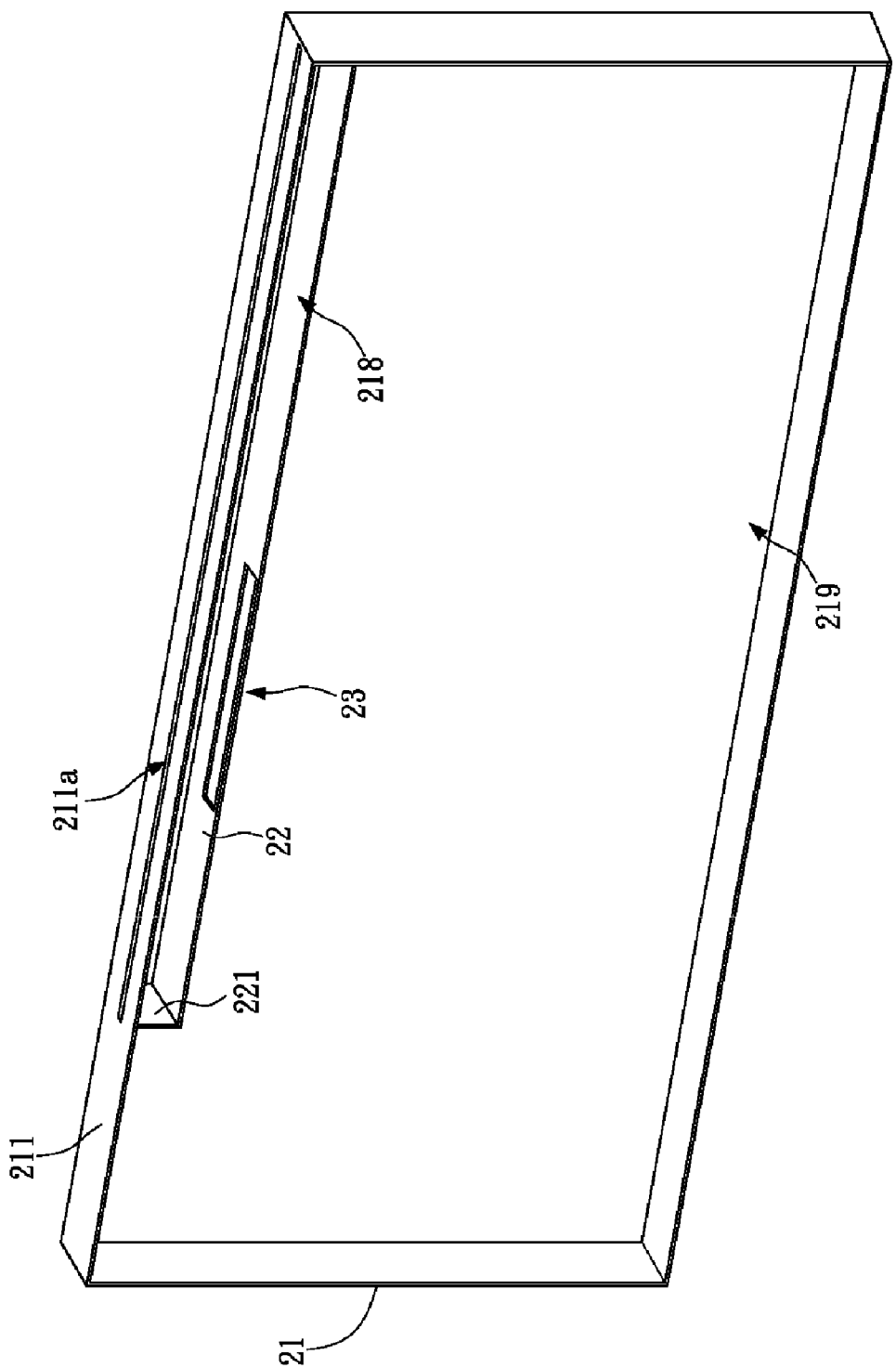
FIG. 5 is a schematic view (1) of a part of elements according to an embodiment of the present invention.

Please refer to FIG. 5, in which in an implementation, one end of the partition 22 in this embodiment has a first extension portion 221, where the first extension portion 221 extends from one end of the partition 22 to the side edge 211 of the case 21.

Figure 6:
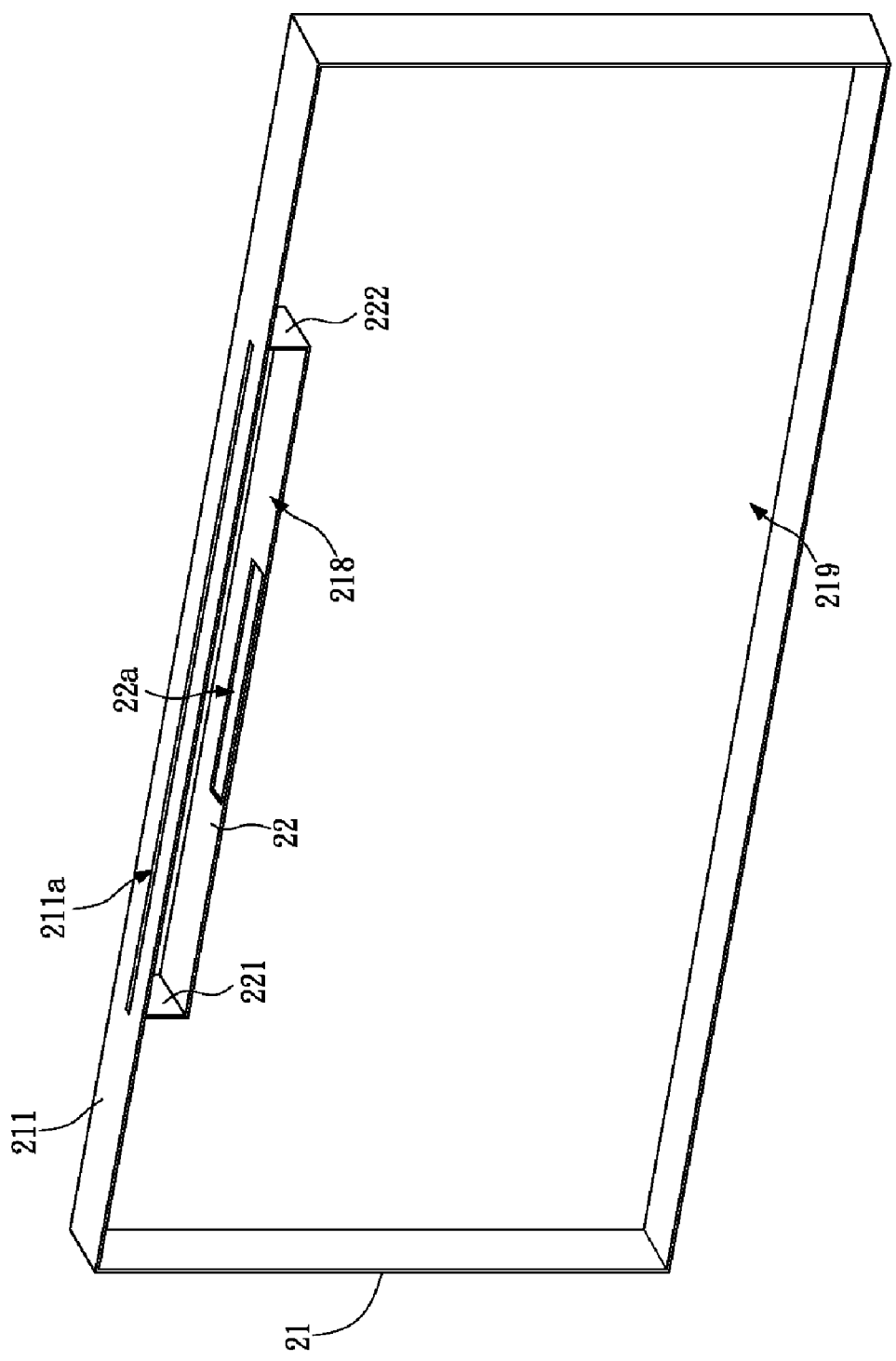
FIG. 6 is a schematic view (2) of a part of elements according to an embodiment of the present invention.

Based on the above, please refer to FIG. 6, in which in another implementation, the other end of the partition 22 in this embodiment has a second extension portion 222, where the second extension portion 222 extends from the other end of the partition 22 to the side edge 211 of the case 21.

It should be noted that in the present invention, the distance D1 between the partition 22 and the side edge 211 is decided by flow of the fan 24, a back pressure at the air outlet 241 of the fan, and wattage required by the electronic device for heat dissipation. It is assumed that the output of the fan 24 is fixed, so that when the wattage required by the electronic device for heat dissipation is relatively high, the distance D1 can be properly raised, for example, 2 cm, so as to reduce the back pressure at the air outlet 241 of the fan 24 and increase the flow of the fan, thereby improving the wattage for heat dissipation; and similarly, when the wattage required by the electronic device for heat dissipation is relatively small, the distance D1 can be properly adjusted, for example, 0.5 cm, and at this time, the back pressure at the air outlet 241 will be relatively high and the flow of the fan 24 will be lowered; however, design flexibility of the internal space of the case 21 can be improved.

In addition, the present invention also provides a housing of an electronic device, which is mainly composed of the case 21 and the partition 22 that are disclosed in the foregoing embodiments. In addition, the housing of an electronic device provided by the present invention may also include the air guiding structure 25 disclosed in the foregoing embodiments.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A housing of an electronic device, applicable in an electronic device comprising a fan, comprising:
    a case, having a side edge, wherein the side edge is provided with a slit; and
    a partition, disposed in the case, separated by a distance with the slit, and dividing the interior of the case into a first space and a second space, wherein the partition has a through hole, the second space is in communication with the first space through the through hole, the first space is in communication with the outside of the case through the slit, the second space is used for receiving the fan, and an air flow blown by the fan flows through the through hole and enters the first space.

2. The housing of an electronic device according to claim 1, wherein the size of the distance is in a range from 0.5 centimeter to 2 centimeters.

3. The housing of an electronic device according to claim 1, wherein the slit extends to two ends of the side edge.

4. The housing of an electronic device according to claim 1, wherein one end of the partition has a first extension portion, which extends from one end of the partition to the side edge of the case.

5. The housing of an electronic device according to claim 4, wherein the other end of the partition has a second extension portion, which extends from the other end of the partition to the side edge of the case.

6. The housing of an electronic device according to claim 1, further comprising an air guiding structure, disposed at the through hole of the partition, and used for guiding the air flow blown by the fan to spread along a longitudinal axis of the slit.

7. An electronic device, comprising:
- a case, having a side edge, wherein the side edge is provided with a slit; and
- a partition, disposed in the case, separated by a distance with the slit, and dividing the interior of the case into a first space and a second space, wherein the partition has a through hole, the second space is in communication with the first space through the through hole, and the first space is in communication with the outside of the case through the slit;
- a circuit board, disposed in the second space; and
- a fan, disposed in the second space, and having an air outlet adjacent to the through hole.

8. The electronic device according to claim 7, wherein the size of the distance is in a range from 0.5 centimeter to 2 centimeters.

9. The electronic device according to claim 7, wherein the slit extends to two ends of the side edge.

10. The electronic device according to claim 7, wherein one end of the partition has a first extension portion, which extends from one end of the partition to the side edge of the case.

11. The electronic device according to claim 10, wherein the other end of the partition has a second extension portion, which extends from the other end of the partition to the side edge of the case.

12. The electronic device according to claim 7, further comprising an air guiding structure, disposed at the opening of the partition, and used for guiding the air flow blown by the fan to spread along a longitudinal axis of the slit.

* * * * *